United States Patent [19]

Niskanen et al.

[11] Patent Number: 5,273,626
[45] Date of Patent: Dec. 28, 1993

[54] ADJUSTABLE-CROWN ROLL

[75] Inventors: Juhani Niskanen, Oulunsalo; Kyösti Uuttana, Jyväskylä, both of Finland

[73] Assignee: Valmet Paper Machinery Inc., Finland

[21] Appl. No.: 816,139

[22] Filed: Dec. 31, 1991

[30] Foreign Application Priority Data

Jan. 7, 1991 [FI] Finland .................................. 910080

[51] Int. Cl.⁵ .............................................. D21G 1/02
[52] U.S. Cl. ................................ 162/361; 100/162 B; 100/170; 100/172; 492/7
[58] Field of Search .................... 100/162 B, 172, 170; 29/116.2; 162/358.1, 361; 384/108, 109, 100; 492/7

[56] References Cited

U.S. PATENT DOCUMENTS

| | | | |
|---|---|---|---|
| Re. 32,586 | 2/1988 | Schiel et al. | |
| 3,705,751 | 12/1972 | Dee | 384/108 |
| 3,949,455 | 4/1976 | Biondetti | 29/116.2 |
| 4,414,890 | 11/1983 | Sciel et al. | |
| 4,639,990 | 2/1987 | Schiel et al. | |
| 4,796,525 | 1/1989 | Schiel et al. | |
| 4,962,577 | 10/1990 | Kubik et al. | |

FOREIGN PATENT DOCUMENTS

| | | |
|---|---|---|
| 3608374 | 9/1987 | Fed. Rep. of Germany . |
| 822393 | 7/1982 | Finland . |
| 853601 | 11/1984 | Finland . |
| 881196 | 3/1988 | Finland . |

Primary Examiner—W. Gary Jones
Assistant Examiner—Brenda Lamb
Attorney, Agent, or Firm—Steinberg & Raskin

[57] ABSTRACT

The invention concerns an adjustable-crown roll having a stationary roll axle which is supported on the machine frame by means of articulated bearings, and a roll mantle which is arranged to revolve on the axle. Hydrostatic loading members or an equivalent pressure fluid chamber or series of chambers are arranged in the space between the axle and the roll mantle. By means of the loading members or equivalent, the profile of a nip formed with a counter-roll of the roll is regulated. A support bushing arranged concentrically with the roll mantle is attached to one end of the roll mantle and revolves along with the roll mantle. A bearing is installed on the support bushing. The bearing receives axial forces from the roll mantle and transfers the same to the machine frame through the non-revolving bearing bock or housing of the bearing. The bearing is arranged, in the axial direction, outside the roll, whereby the roll is suitable for use as a hot roll.

10 Claims, 3 Drawing Sheets

ADJUSTABLE-CROWN ROLL

BACKGROUND OF THE INVENTION

The present invention is related to adjustable-crown roll, comprising a stationary roll axle which is supported on the machine frame or equivalent by means of articulated bearings, a roll mantle arranged to revolve on the axle, and hydrostatic loading members or an equivalent pressure fluid chamber or series of chambers arranged in a space between the roll axle and the roll mantle. By means of the loading members or equivalent, the profile of the nip, which can be formed with a counter-roll of the roll, can be regulated. The loading members or equivalent are fitted substantially in the plane of at least the nip. A support bushing arranged concentrically with the roll mantle is attached to at least one end of the roll mantle to revolve along with the roll mantle.

At present, the construction of adjustable-crown rolls is usually such that the roll mantle is arranged to revolve on the stationary roll axle, on which the roll mantle is supported in a suitable way, e.g. by means of hydraulic loading members, so that by means of the loading members, the deflection of the roll mantle and the roll axle in relation to one another can be adjusted in a desired way.

Generally, the roll mantle is additionally supported on the roll axle by means of bearings placed at the ends of the mantle, in particular by means of roller bearings or equivalent rolling-contact bearings which also receive the axial forces. Such a construction involves a number of drawbacks, especially when it is applied to hot rolls and to rolls provided with a drive gear. One of these drawbacks is that the end bearing of a roll requires very precise machinings to be made into the roll mantle and, moreover, a rolling-contact bearing at the end of the mantle makes the drive of the roll more difficult.

If the rolling-contact bearing is replaced by some other solution, the above problems can be avoided. Problems of the rolls with no rolling-contact bearings are, however, the grinding of the roll and in particular the requirements of precision imposed on the grinding as well as the receiving of the axial forces.

Further, it is a problem of hot rolls that a certain viscosity is required from the oil circulating in the rolls in order that the lubrication of the bearings should operate properly. In hot rolls, the oil may become excessively hot, which may, in the worst case, result in seizing of the bearings.

In hot rolls, attempts have been made to avoid said problem, e.g. by placing the end bearings of the roll mantle outside the roll mantle. This has been the case, e.g. in the solution described in FI Patent Application No. 853223 (corresponding to U.S. Pat. No. 4,679,287, Beloit Corp.) in which particular extension bushings have been attached to the ends of the roll mantle, by whose means the roll mantle has been mounted on the roll axle from outside the mantle. Therein, rolling-contact bearings are used, which are placed between said extension bushing and the roll axle. The arrangement described in this publication, however, requires quite complicated sealing and insulation arrangements at the ends of the roll so that the roll can be used as a hot roll so that excessive heat cannot affect the end bearings. Thus, in view of the drive of the roll, the solution of this publication is not fully free from problems, and fitting of the drive gear at the roll end cannot be accomplished in an easy and simple way.

On the other hand, FI Published Patent Application No. 79,895 (corresponding to U.S. Pat. No. 4,520,723, Kleinewefers GmbH), describes an arrangement in which conventional rolling-contact bearings at the roll ends are replaced by hydrostatic bearings In view of the drive of the roll, this can be probably considered an improvement, but the solution of this publication cannot be applied to a hot roll as such. This already comes from the drawbacks discussed above, in particular from the fact that the heat can affect the bearing at the roll end directly, whereby extremely high requirements are imposed on the viscosity of the oil so that the hydrostatic bearing may operate in a desired way.

In practice, hot rolls in a paper machine must always be provided with a drive in order that the roll becomes warm evenly in the direction of the circumference. For example, the counter-roll drive applied in supercalenders cannot be used in hot rolls because of the high surface temperature. The surface temperatures may be of an order of 200° C.

Thus, the object of the present invention is to provide an adjustable-crown roll, in particular, a hot roll, by whose means the drawbacks related to the present day technology are avoided.

A further object of the invention is to provide a roll whose roll mantle is as simple as possible without undue and precise machinings.

SUMMARY OF THE INVENTION

In view of achieving the objectives of the invention stated above and others, the present invention is related to a bearing installed on a support bushing which receives axial forces, the axial forces of the roll mantle being transferred to the machine frame through the non-revolving bearing block connected to the housing of said bearing.

By means of the invention, a number of advantages are achieved over the prior art.

First, by virtue of the invention, the end bearings of the roll mantle are placed outside the mantle so that the sealing of the roll can be arranged freely. Thus, the roll in accordance with the invention is suitable for use as a hot roll.

A second significant advantage of the invention is that the drive gear of the roll can be fitted in connection with the roll by means of simple operations, whereby the bearing placed at the drive end of the roll can, at the same time, operate as the bearing of the drive gear.

It is another advantage of the invention that extra machinings in the roll mantle for the journalling are not required. This is a significant factor in view of the cost of manufacture.

The further advantages and characteristic features of the invention are further explained in the following detailed description of the invention.

BRIEF DESCRIPTION OF THE DRAWINGS

In the following, the invention will be described by way of example with reference to the exemplifying embodiments shown in the figures in the accompanying drawing.

DETAILED DESCRIPTION

Figure 1:
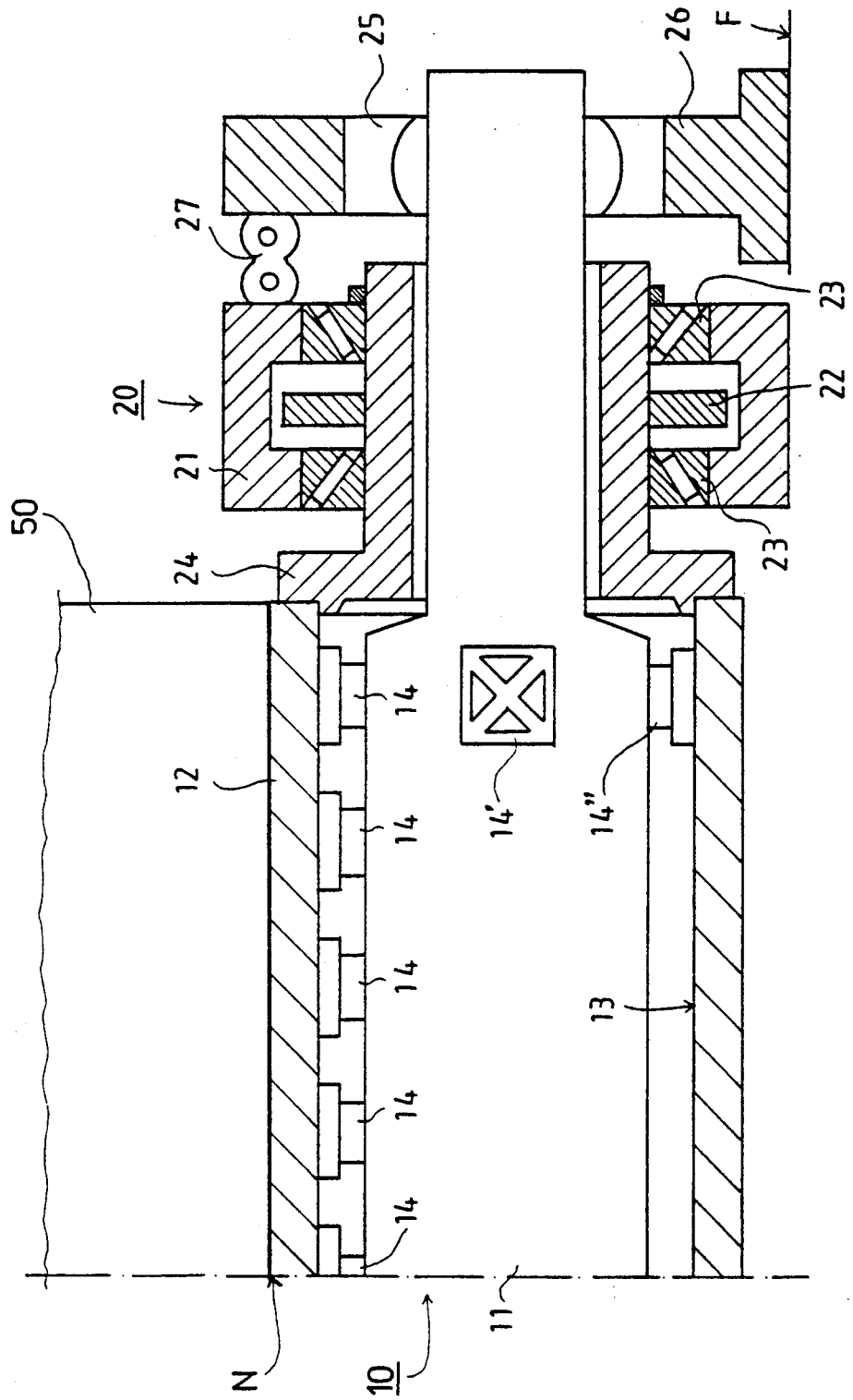
FIG. 1 shows an embodiment of a roll in accordance with the invention in which the journalling of the roll is combined with the drive gear of the roll.

In FIG. 1, the adjustable-crown roll in accordance with the invention is denoted generally with the reference numeral 10. The roll 10 comprises a stationary roll axle 11, which is, by its ends, supported by means of ordinary articulated bearings 25 on the machine frame F or equivalent. The bearing block of the articulated bearing 25 is, in FIG. 1, denoted with the reference numeral 26.

The roll mantle 12 is arranged to revolve on the roll axle 11. In the embodiment shown in FIG. 1, the roll mantle is adjustably supported on the roll axle 11 by means of hydrostatic loading members 14. The hydrostatic loading members 14 are adjustably arranged in the roll axle 11, and are supported in the conventional way against the inner face 13 of the roll mantle.

As is shown in FIG. 1, a support bushing 24 is attached to the end of the roll mantle 12, which bushing acts as an extension of the roll mantle 12 and surrounds the roll axle 11 while revolving along with the roll mantle 12. Further, in the embodiment shown in FIG. 1, the roll 10 is provided with a drive gear, which is denoted generally with the reference numeral 20.

The drive gear 20 comprises a housing 21, in whose interior the drive wheel 22 is fitted, which is fixed to the support bushing 24. Thus, power is transferred to the roll 10 through the support bushing 24. In FIG. 1, the bearings of the drive gear 20 are denoted with the reference numerals 23, and are placed, in the way shown in the figure, placed between the housing 21 of the drive gear and the support bushing 24, i.e. on the support bushing 24.

In the embodiment shown in FIG. 1, the bearings 23 of the drive gear 20 are conventional rolling-contact bearings, in particular tapered roller bearings, which receive the axial forces from the roll mantle. The arrangement also permits the use of bearings of other types, e.g. of hydrostatic bearings, if they are constructed in such a way that they can transfer axial forces.

From the bearings, axial forces are transferred to the machine frame F by means of an axial support 27 which interconnects the housing 21 of the drive gear and the bearing block 26, as is shown in FIG. 1.

In FIG. 1, the sealing solutions of the roll 10 are not shown at all, because, in this solution in accordance with the invention, the end bearings of the roll are completely isolated from the interior of the roll so that the heat effective in the roll cannot have an adverse effect on the bearings 23. Thus, the interior space in the roll can be sealed in relation to the axle 11 in any way whatsoever that it is known in the prior art.

Figure 2:
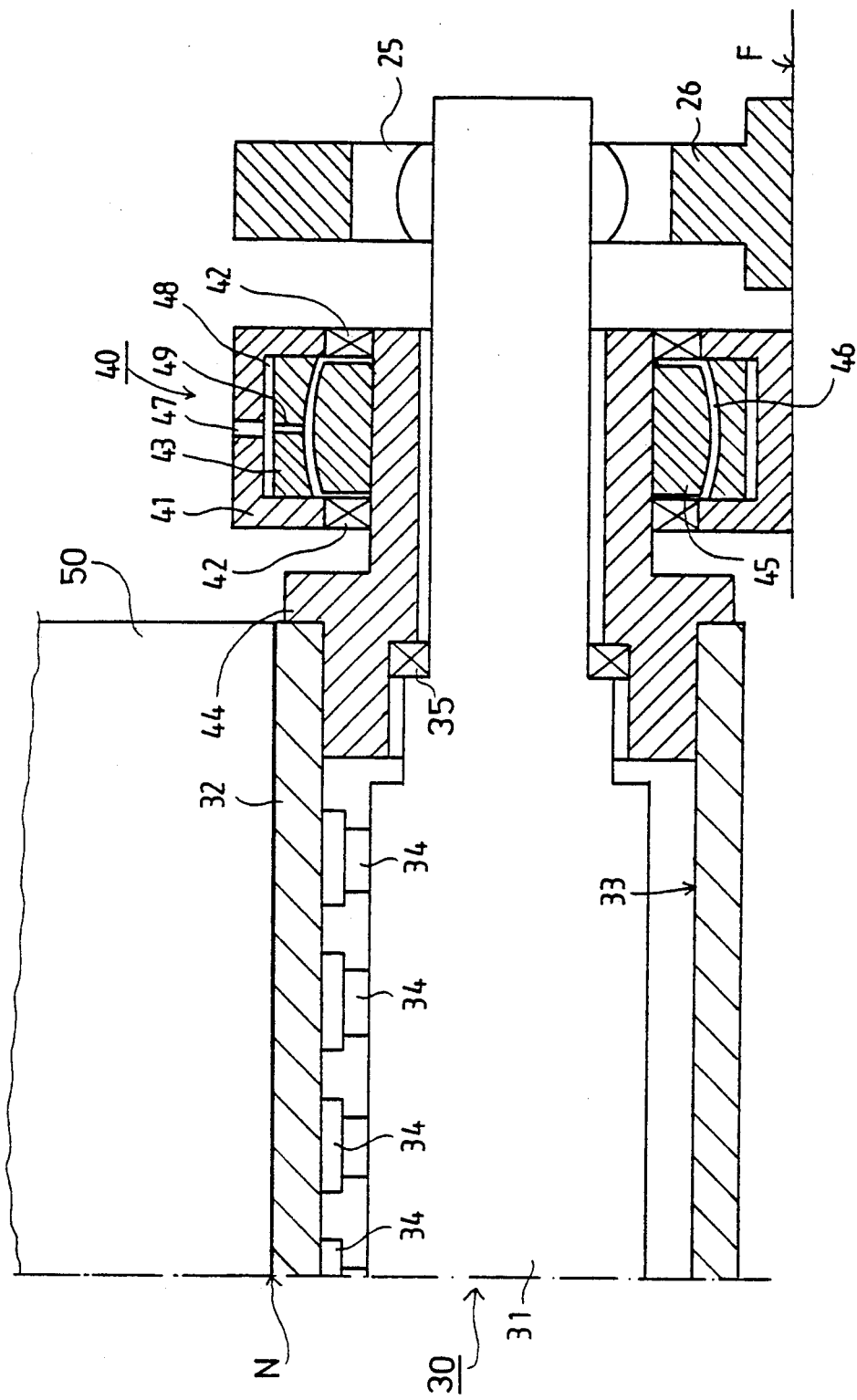
FIG. 2 shows an embodiment of a roll in accordance with the invention in which a hydrostatic bearing arranged outside the roll is employed for the journalling of the roll.

FIG. 2 shows a second embodiment of the invention, in which embodiment the roll is denoted generally with the reference numeral 30. The roll 30 comprises a stationary roll axle 31, on which the roll mantle 32 is arranged to revolve. In the interior of the roll 30, in the space between the axle 31 and the mantle 32, hydrostatic loading members 34 are provided, which are fitted in the roll axle 31 adjustably and which are supported against the inner face 33 of the roll mantle at the nip N formed with the counter-roll 50, in a way corresponding to that used in the embodiment shown in FIG. 1. A support bushing 44 similar to that shown in the embodiment of FIG. 1 is also attached to the end of the roll mantle 32 of the roll 30 as shown in FIG. 2. The roll axle 31 is supported on the machine frame F or equivalent by means of an articulated bearing 25, whose bearing block is denoted with the reference numeral 26 in the figure.

As stated above, the embodiment shown in FIG. 2 represents an adjustable-crown roll 30 that is not provided with a drive, or correspondingly, a roll provided with a drive but seen from the end opposite to the drive gear. Thus, a solution as shown in FIG. 2 might be applied, e.g. to the opposite end of a driven roll as shown in FIG. 1.

In FIG. 2, the bearing of the roll is denoted generally with the reference numeral 40. According to this embodiment, the bearing 40 is fitted in the axial direction completely outside the roll mantle 32. The bearing 40 shown in FIG. 2 is a hydrostatic bearing, and it comprises a bearing housing 41, which is sealed by means of the seals 42 against the outer face of the support bushing 44. The inner ring 45 of the bearing, which is placed inside the bearing housing 41, is attached to the support bushing 44 so that the inner ring 45 revolves along with the support bushing 44. The outer ring 43 of the bearing is placed in the bearing housing 41 so that there is a gap 46 between the outer ring 43 and the inner ring 45. In a corresponding way, in the bearing housing 41, in the radial direction outside the outer ring 43 of the bearing, there is a pressure space 48 defined by the housing 41 and by said outer ring 43 of the bearing. Into the bearing housing 41, a first bore 47 has been formed, which opens into said pressure space 48. In a corresponding way, into the outer ring 43 of the bearing, a second bore 49 has been formed, which interconnects the pressure space 48 and the gap 46 between the inner and the outer ring 45, 43 of the bearing.

In the operation of a hydrostatic bearing 40 as shown in FIG. 2, the pressure medium, such as hydraulic fluid, is fed through the first bore 47 into the pressure space 48, from which the pressure medium runs further, through the second bore 49, into the gap 46, so that the pressure medium that was fed into the gap 46 keeps the bearing faces of the inner and outer rings 45, 43 of the bearing, placed facing one another, apart from one another thus permitting rotation of the inner and outer rings 45, 43 in relation to one another. According to FIG. 2, the bearing faces of the inner and outer rings 45, 43 of the hydrostatic bearing 40 have a curved shape, whereby the bearing also receives axial forces. The axial forces can be transferred from the bearing 40 to the machine frame F, in accordance with FIG. 2, so that the bearing housing 41 is supported directly on the frame F. However, if the same construction is used in the roll 30 as shown in FIG. 1, wherein the roll is "floating" and fully hydrostatically supported, the bearing housing 41 is not supported directly on the machine frame F, but the bearing housing 41 is connected axially to the bearing block 26 of the articulated bearing by means of a similar axial support 27, through which the axial forces are transferred to the machine frame F.

Figure 3:
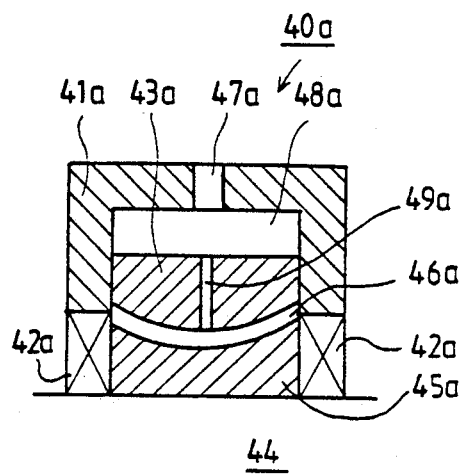
FIGS. 3 to 5 show embodiments alterative to the journalling of the roll illustrated in FIG. 2.
Figure 4:
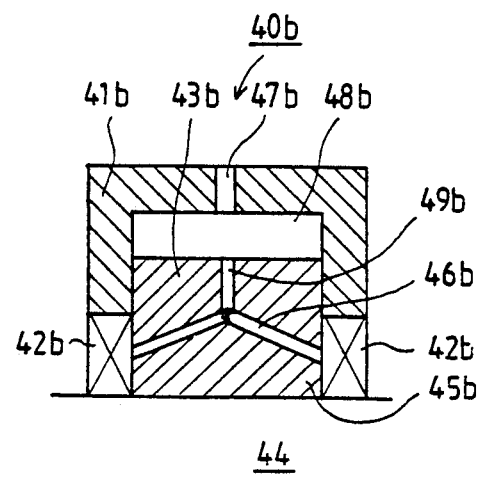
Figure 5:
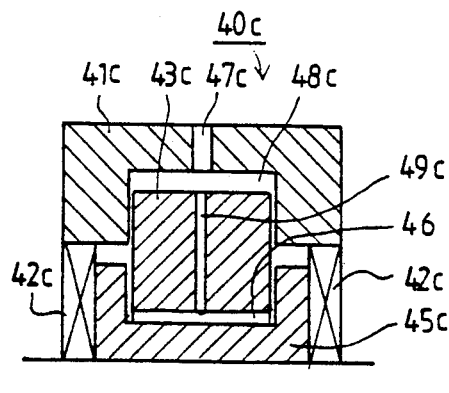

FIGS. 3 to 5 illustrate embodiments alternative to the hydrostatic gearing 40 shown in FIG. 2. The reference numerals in FIGS. 3 to 5 are in the other respects the same as those in FIG. 2 with the exception that in FIG.

3 the reference numerals are provided with the reference letter a, in FIG. 4 with b, and in FIG. 5 with c.

In FIG. 2 the bearing faces of the inner and outer rings 45, 43 of the bearing 40 have a curved shaped, so that the bearing face of the outer ring was concave and the bearing face of the inner ring 45 was convex. In the bearing 40a shown in FIG. 3, the arrangement is reversed, so that the bearing face of the outer ring a of the bearing is convex and, in a correspond way, the bearing face of the inner ring 45a of the bearing concave.

In a corresponding way, in the bearing 40b as shown in FIG. 4, the bearing face of the outer ring 43b of the bearing is shaped as a v-section groove, and correspondingly the bearing face of the inner ring 45b of the bearing is shaped in accordance with the shape of the outer ring 43b.

In the bearing 40c as shown in FIG. 5, the bearing face of the inner ring 45c of the bearing is shaped as a U-section trough, and the plane bearing face of the outer ring 43c of the bearing is shaped so as to fit into this U-section trough. With all of these embodiments, the hydrostatic bearing also receives the axial forces.

Figure 6:
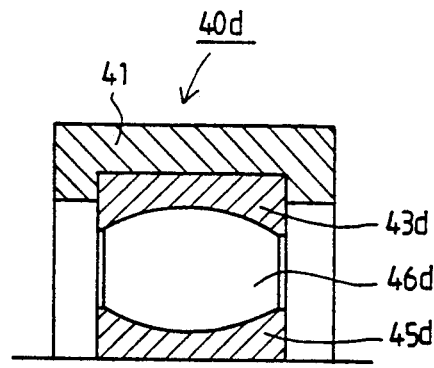
FIG. 6 shows an embodiment of the journalling of a roll in which an ordinary rolling-contact bearing is employed instead of a hydrostatic bearing.

In the embodiment shown in FIG. 6, the bearing 40d is a conventional spherical roller bearing, in which the outer ring of the bearing is denoted with the reference 43d, the inner ring with the reference 45d and the bearing members, i.e. the spherical rolls, with the reference 46d. In a corresponding way, the bearing block is denoted with the reference 41d.

As is well known, a bearing 40d as shown in FIG. 6 also receives the axial forces. Instead of a bearing 40d as shown in FIG. 6, it is, of course, possible to employ any conventional bearing whatsoever that also receives the axial forces.

Above, the invention has been described by way of example with reference to the exemplifying embodiments shown in the figures in the drawing. The invention is however, not confined to the exemplifying embodiments shown in the figures alone, but different embodiments of the invention may show variation within the scope of the inventive idea defined in the accompanying claims.

What is claimed is:

1. An arrangement for an adjustable-crown roll, comprising
    a machine frame,
    an adjustable crown roll comprising a stationary roll axle and a roll mantle arranged to revolve on said roll axle,
    a counter-roll, a nip being defined between said adjustable crown roll and said counter-roll,
    articulated bearings including respective non-revolving bearing blocks, said roll axle being supported on said machine frame by means of said articulated bearings,
    loading members arranged in a space between said roll axle and said roll mantle and being fitted substantially in the plane of the nip, said loading members regulating the profile of the nip,
    a support bushing attached to an end of said roll mantle and arranged concentrically with said roll mantle such that said support bushing revolves along with said roll mantle,
    a bearing arranged on said support bushing, said bearing including a non-revolving housing, said bearing structured and arranged for receiving axial forces from said roll mantle and for transferring said axial forces of the roll mantle to said machine frame through said non-revolving housing of said bearing,
    a drive gear having a housing, said housing being constituted by said non-revolving housing of said bearing, said housing of said drive gear being mounted on said support bushing by means of said bearing, said drive gear transferring power to said roll through said support bushing, and
    an axial support interconnecting said housing of said drive gear and said bearing block of a respective articulated bearing, the axial forces from said roll mantle being transferred to said machine frame by means of said axial support.

2. The arrangement of claim 1, wherein said loading members are hydrostatic.

3. The arrangement of claim 1, wherein said bearing is a hydrostatic bearing.

4. The arrangement of claim 1, wherein said bearing is a rolling-contact bearing.

5. The arrangement of claim 1, wherein said bearing blocks are supported on said machine frame.

6. An arrangement for an adjustable-crown roll, comprising
    a machine frame,
    an adjustable crown roll comprising a stationary roll axle and a roll mantle arranged to revolve on said roll axle,
    a counter-roll, a nip being defined between said adjustable crown roll and said counter-roll,
    articulated bearings including respective non-revolving bearing blocks, said roll axle being supported on said machine frame by means of said articulated bearings,
    loading members arranged in a space between said roll axle and said roll mantle and being fitted substantially in the plane of the nip, said loading members regulating the profile of the nip,
    a first support bushing attached to a first end of said roll mantle and arranged concentrically with said roll mantle such that said first support bushing revolves along with said roll mantle,
    a bearing arranged on said first support bushing, said bearing including a first non-revolving housing, said bearing structured and arranged to receive axial forces from said roll mantle and transfer said axial forces of the roll mantle to said machine frame through said housing of said bearing,
    a second support bushing attached at a second end of said roll mantle opposite to said first end, said second support bushing being arranged concentrically with said roll mantle such that said second support bushing revolves along with said roll mantle,
    a drive gear having a second housing, said second housing of said drive gear being mounted on said second support bushing by means of additional bearings, said drive gear transferring power to said roll through said second support bushing, the axial forces of the roll mantle being transferred to said machine frame via said additional bearings, and
    an axial support interconnecting said second housing of said drive gear and said bearing block, the axial forces from said roll mantle being transferred to said machine frame by means of said axial support.

7. The arrangement of claim 6, wherein said loading members are hydrostatic.

8. The arrangement of claim 6, wherein said bearing is a hydrostatic bearing.

9. The arrangement of claim 6, wherein said bearing is a rolling-contact bearing.

10. The arrangement of claim 6, wherein said first housing of said bearing is supported on said machine frame.

* * * * *